(12) United States Patent
Baek et al.

(10) Patent No.: US 8,208,493 B2
(45) Date of Patent: Jun. 26, 2012

(54) APPARATUS AND METHOD FOR TRANSMITTING BROADCAST DATA IN DIGITAL BROADCASTING SERVICE SYSTEM

(75) Inventors: Woo-Hyun Baek, Seoul (KR); Hyun-Sup Yun, Suwon-si (KR); Ji-Ho Park, Seoul (KR); Jong-Won Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 602 days.

(21) Appl. No.: 11/705,572

(22) Filed: Feb. 12, 2007

(65) Prior Publication Data
US 2007/0206590 A1   Sep. 6, 2007

(30) Foreign Application Priority Data
Feb. 10, 2006 (KR) .................. 10-2006-0013302

(51) Int. Cl.
*H04J 3/24* (2006.01)
(52) U.S. Cl. ........................ 370/474; 370/352
(58) Field of Classification Search .................. 370/480, 370/338, 352, 474; 725/135, 40, 62–63, 725/71, 78, 81, 91, 109–110, 133, 153; 710/52; 348/725; 375/240.26
See application file for complete search history.

(56) References Cited

U.S. PATENT DOCUMENTS

| | | | |
|---|---|---|---|
| 2002/0097701 A1* | 7/2002 | Lupien et al. ................ | 370/338 |
| 2002/0147990 A1* | 10/2002 | Lu et al. ....................... | 725/135 |
| 2002/0161847 A1* | 10/2002 | Weigand et al. .............. | 709/213 |
| 2003/0220100 A1* | 11/2003 | McElhatten et al. .......... | 455/418 |
| 2004/0049779 A1* | 3/2004 | Sjoblom et al. ................ | 725/13 |
| 2004/0117825 A1* | 6/2004 | Watkins ........................ | 725/40 |
| 2005/0235048 A1* | 10/2005 | Costa-Requena et al. .... | 709/219 |
| 2005/0237434 A1* | 10/2005 | Takatori et al. ............... | 348/725 |
| 2006/0248557 A1* | 11/2006 | Stark et al. ..................... | 725/37 |
| 2006/0277577 A1* | 12/2006 | Kiiskinen et al. .............. | 725/62 |
| 2008/0175325 A1* | 7/2008 | Hannuksela et al. .... | 375/240.26 |

FOREIGN PATENT DOCUMENTS

| KR | 1020020043385 | 6/2002 |
|---|---|---|
| KR | 1020050066802 | 6/2005 |
| KR | 1020060012510 | 2/2006 |
| KR | 100653187 | 11/2006 |

* cited by examiner

*Primary Examiner* — Derrick Ferris
*Assistant Examiner* — Matthew Hopkins
(74) *Attorney, Agent, or Firm* — The Farrell Law Firm, P.C.

(57) ABSTRACT

Disclosed is an apparatus and method for transmitting broadcast data in a digital broadcasting service system. The apparatus includes a server terminal for receiving a digital broadcast transport stream from a digital broadcast service provider, removing a header used for the digital broadcast reception from the received broadcast stream, and transmitting a stream of broadcast data from which the header has been removed; and at least one client terminal for accessing the server terminal through an Internet Protocol (IP) network, and receiving and outputting the stream of broadcast data from which the header has been removed. The apparatus enables the user to view DVB-H broadcasts through an existing terminal, even without buying a terminal having the ability to receive a DVB-H transport stream.

15 Claims, 5 Drawing Sheets

| RF FREQUENCY | DVB-H SERVICE INFORMATION | | | |
| --- | --- | --- | --- | --- |
| | CHANNEL | SERVICE NAME | SERVICE TYPE | STATUS |
| 690 MHz Bandwidth 8MHz FEC | CHANNEL 1 | CNN | TV | Running |
| | CHANNEL 2 | BBC news | TV | Running |
| | | BBC Audio | Radio | Running |
| | | BBC Radio 2 | Radio | Running |
| | CHANNEL 3 | RAI International | TV | Running |
| | CHANNEL 4 | Sky Info | Data | Not Running |
| | | | | |
| 700 MHz Bandwidth 5 MHz | CHANNEL 1 | RAI 2 | TV | Running |
| | CHANNEL 3 | Euro sports | TV | Running |
| | CHANNEL 4 | Euro music | TV | Running |
| | | | | |
| 710 MHz Bandwidth 5 MHz | | | | |
| | | | | |
| | | | | |

FIG.3

| SERVICE NAME | <== 08 : 00 | 09 : 00 | 10 : 00 | 11 : 00 ==> |
|---|---|---|---|---|
| CNN | 08:30 News 1<br>08:40 HOT news | 09:20 Headline news | Headline news (cont) | 11:00 Prime News |
| BBC | 08:10 BBC Prime | 09:20 Drama 2 | 10:20 Music | 11:30 News |
| RAI International | ... | ... | ... | ... |
| ... | | | | |

FIG.4

| CNN | 08 : 30 |
|---|---|
| News 1 | This is CNN Prime news, Guest is . . . . . . <br> . . . . . <br> . . . . . |

FIG.5

APPARATUS AND METHOD FOR TRANSMITTING BROADCAST DATA IN DIGITAL BROADCASTING SERVICE SYSTEM

PRIORITY

This application claims the benefit under 35 U.S.C. 119(a) of an application entitled "Apparatus And Method For Transmitting Broadcast Data In Digital Broadcasting Service System" filed in the Korean Intellectual Property Office on Feb. 10, 2006 and assigned Serial No. 2006-13302, the entire contents of which are incorporated herein by reference.

BACKGROUND OF THE INVENTION

1. Field of the Invention

The present invention relates to a digital broadcasting service system, and more particularly to an apparatus and method for transmitting broadcast data in a digital broadcasting service system.

2. Description of the Related Art

Digital Video Broadcasting-Handheld (DVB-H) service represents a broadcasting service for a handheld terminal, which is currently being developed by DVB (Digital Video Broadcasting) that is an organization for the standardization of digital TV broadcasting schemes in Europe, following the DVB-S (Digital Video Broadcasting-Satellite) TV, the DVB-C (Digital Video Broadcasting-Cable) TV and the DVB-T (Digital Video Broadcasting-Terrestrial) TV.

The development of the DVB-H service is promoted in consideration of the fact that large-capacity multimedia content such as movies, broadcast dramas, and the like cannot be properly provided to a handheld terminal through the third-generation Universal Mobile Telecommunications System (UMTS), DVB-T TV or Digital Audio Broadcasting (DAB) systems.

The target of the DVB-H service is that a handheld terminal user can receive and view a clear image having an image quality of 96 kbps to 384 kbps, the viewing occurring while the terminal is moving at a high speed. The DVB-H service adopts a time slicing multiplexing scheme in order to reduce power consumption in a handheld terminal.

The time slicing technique is a type of digital multiplexing, which slices the capacity of a transmission path into time slots and transmits packetized broadcasting signals through each of the time slots. Therefore, in order to be provided with the DVB-H service, a terminal capable of receiving and demodulating a DVB-H broadcast Transport Stream (TS) is required.

A terminal not having the receiving and demodulating functions for a DVB-H transport stream cannot receive a DVB broadcast. In order to view DVB-H broadcasts, the user must buy a terminal capable of receiving and demodulating a DVB-H transport stream.

A terminal (e.g., a cellular phone, a notebook computer, a digital TV, etc.) capable of receiving and demodulating a DVB-H transport stream, is quite expensive.

SUMMARY OF THE INVENTION

Accordingly, the present invention has been made to solve at least the above-mentioned problems occurring in the prior art, the present invention provides an apparatus and method for transmitting broadcast data in a digital broadcasting service system, which enables the user to view DVB-H broadcasts through an existing terminal, even without buying a new terminal which can be provided with a DVB-H transport stream.

In addition, the present invention provides an apparatus and method for transmitting broadcast data in a digital broadcasting service system, in which a terminal having the ability to receive a DVB-H transport stream receives the DVB-H transport stream and transmits corresponding broadcast data through IP socket communication, so that even a terminal not having the ability to receive and demodulate a DVB-H transport stream can receive broadcast data.

To accomplish these and other objects, in accordance with one aspect of the present invention, there is provided an apparatus for transmitting broadcast data in a digital broadcasting service system, the apparatus including a server terminal for receiving a digital broadcast transport stream from a digital broadcast service provider, removing a header used for the digital broadcast reception from the received broadcast stream, and transmitting a stream of broadcast data from which the header has been removed; and at least one client terminal for accessing the server terminal through an Internet protocol (IP) network, and receiving and outputting the stream of broadcast data from which the header has been removed.

In accordance with another aspect of the present invention, there is provided a method for transmitting broadcast data in a digital broadcasting service system, the method including receiving, by a server terminal, a digital broadcast transport stream from a digital broadcast service provider; removing a header used for the digital broadcast reception from the received broadcast stream; and transmitting a stream of broadcast data, from which the header has been removed, to at least one client terminal.

BRIEF DESCRIPTION OF THE DRAWINGS

The above and other objects, features and advantages of the present invention will be more apparent from the following detailed description taken in conjunction with the accompanying drawings, in which:

FIG. 3 is a diagram illustrating a screen of a DVB-H Service Information web page according to the present invention;

FIG. 4 is a diagram illustrating a screen of detailed information about a specific broadcast service according to the present invention; and FIG. 5 is a diagram illustrating a detailed screen of information about a selected specific broadcast service according to the present invention.

DETAILED DESCRIPTION OF THE PREFERRED EMBODIMENT

Figure 1:
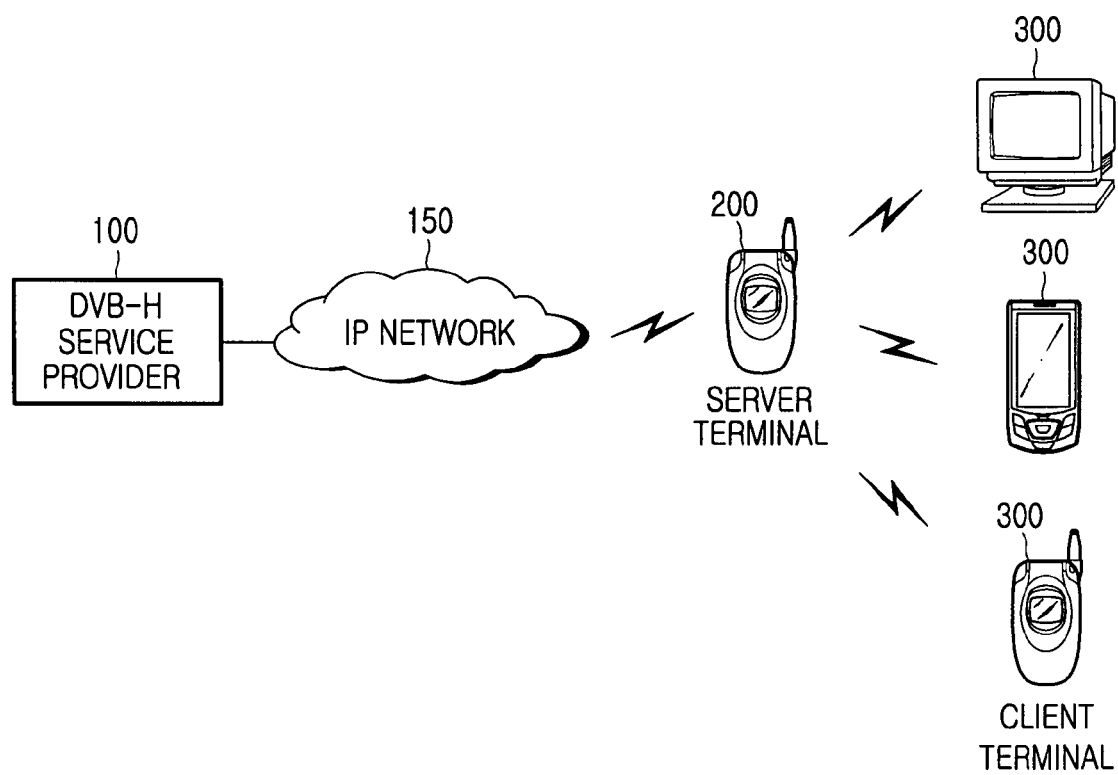
FIG. 1 is a diagram illustrating the construction of a digital video broadcasting-handheld (DVB-H) service system according to the present invention.

Hereinafter, a preferred embodiment according to the present invention will be described with reference to the accompanying drawings. It is to be noted that the same elements are indicated with the same reference numerals throughout the drawings. In the following description of the present invention, a detailed description of known functions and configurations incorporated herein will be omitted when it may obscure the subject matter of the present invention.

FIG. 1 is a diagram illustrating the construction of a digital video broadcasting-handheld (DVB-H) service system according to the present invention. The DVB-H service system according to the present invention includes a DVB-H service provider 100, an IP network 150, a server terminal 200, and at least one client terminal 300. The different client terminal are shown in FIG. 1.

The DVB-H service provider 100 provides a DVB-H service to corresponding providers or corresponding areas. The DVB-H service provider 100 time slices the capacity of a transmission path into time slots, and then transmits a transport stream (TS) by inserting IP-packetized broadcast data into the time slots. The transport stream includes program specification information (PSI). The PSI includes video data, audio data, channel decoding and program information, etc. A real-time transport protocol (RTP) is used for audio/visual (A/V) synchronization.

Also, separately from the PSI, the DVB-H service provider 100 may provide a "FLUTE" protocol required for a DVB-H broadcast and an Electronic Service Guide (ESG) containing additional information about a channel so that the user may obtain broadcast service information. The ESG includes channel information, channel type information, running status information, and program information for broadcasts being currently provided on every channel.

The IP network 150, which provides a communication service using an Internet protocol, can provide an IPv6 network service. Through the IP network 150, a transport stream from the DVB-H service provider 100 is provided to the server terminal 200.

The server terminal 200 can access the IP network 150 by using an IP network service, particularly, an IPv6 network service, and receive a DVB-H transport stream from the DVB-H service provider 100 through access to the IP network 150. The server terminal 200 transmits the received broadcast data to the client terminals 300 by using TCP/IP socket communication. The individual client terminal 300 can receive desired broadcast data through the server terminal 200, if the client terminal can communicate using TCP/IP, even though the client terminal it does not have the ability to receive the DVB-H transport stream.

The server terminal 200 obtains a channel name, running status, channel time, and broadcast program information about a DVB-H service, from ESG information or PSI provided from the DVB-H service provider 100, and forms a DVB-H Service Information web page. When the client terminal 300 accesses the DVB-H Service Information web page, the server terminal 200 transmits corresponding DVB-H Service Information web page data to the client terminal 300. When a specific service is selected by the client terminal 300 from among the services of the DVB-H Service Information web page, the server terminal 200 receives the selected service, removes a header corresponding to a specific protocol such as an RTP used for A/V data synchronization from the received broadcast data, and streams the broadcast data, from which the header has been removed, to the client terminal 300.

In this case, the server terminal 200 can use a high-capacity wireless network, such as a WLAN, Bluetooth, or 3G/3.5G/4G networks, so as to perform the streaming operation.

In addition, since the server terminal 200 can be accessed by more than one client terminal 300, and the DVB-H service can provide a plurality of services through one channel, the server terminal 200 may simultaneously receive a plurality of program identifications (PIDs).

The server terminal 200 can change channels according to channel change requests from a plurality of client terminals 300. When the number of channel change requests from the client terminals 300 exceeds the number of simultaneously available PIDs in a DVB-H baseband chip, the server terminal 200 transmits a service unavailability message to a client terminal 300 which has transmitted a corresponding request.

The client terminal 300 may include a cellular phone, a PC, a notebook computer, a PDA, a digital TV, etc. The client terminal-300 accesses the server terminal 200 through TCP/IP communication, and receives and displays DVB-H Service Information web page data, instead of directly receiving a DVB-H transport stream.

When a specific broadcast service among broadcast services of the DVB-H Service Information web page is selected by the user, the client terminal 300 sends a request for data of the selected broadcast service to the server terminal 200, and then receives and outputs corresponding broadcast service data streamed from the server terminal 200.

When receiving a broadcast channel change request from the user, the client terminal 300 sends a request for a channel change to the server terminal 200, and receives and outputs broadcast service data of the requested channel. When a channel change by the server terminal 200 is impossible, the client terminal 300 receives and outputs a service unavailability message.

As described above, according to the DVB-H service system based on the present invention, a server terminal 200 receives a DVB-H transport stream and transmits corresponding broadcast data through TCP/IP communication, so that at least one client terminal 300, not having the ability to receive a DVB-H transport stream, can receive the broadcast data at the same time.

Figure 2:
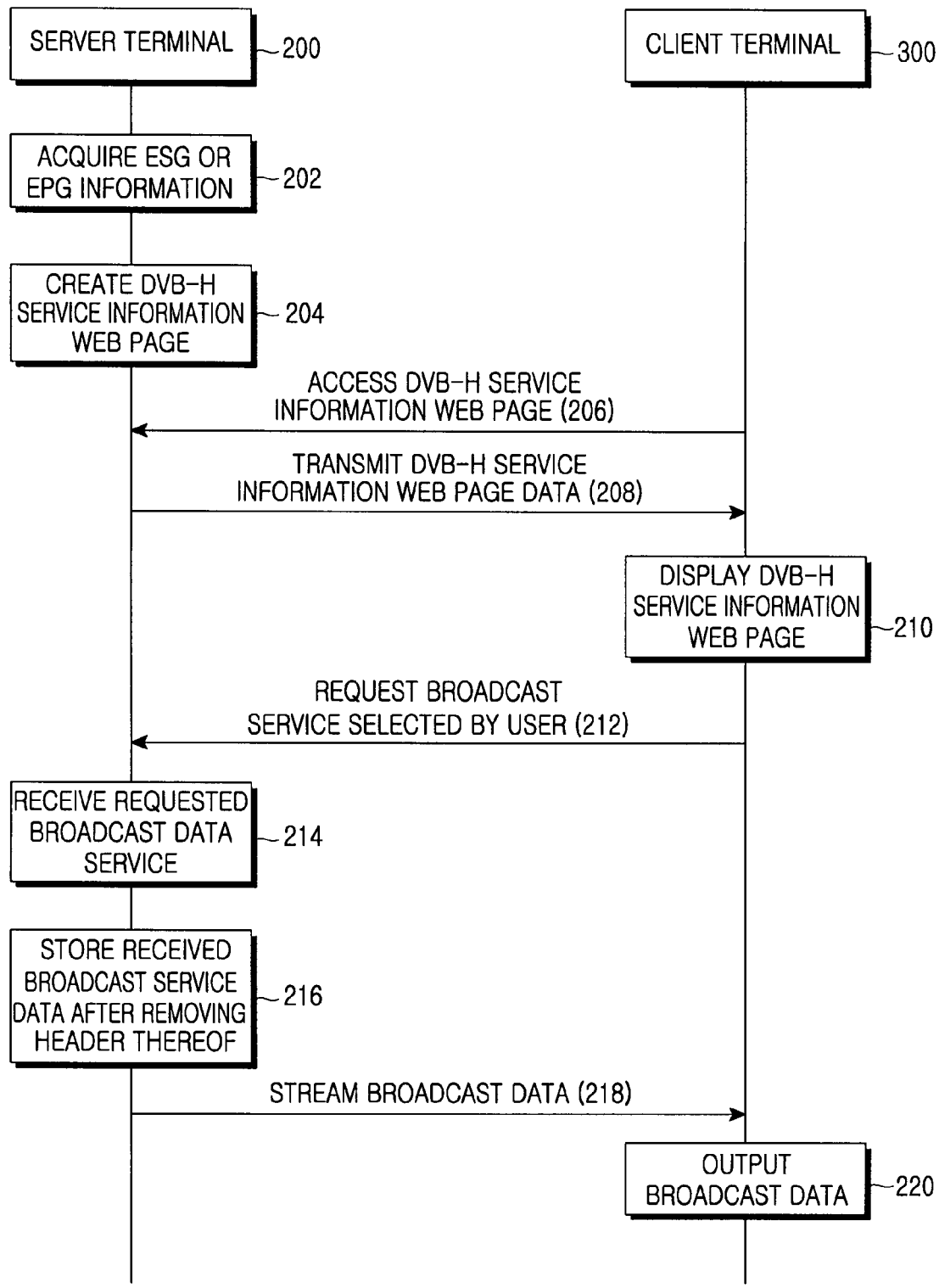
FIG. 2 is a flowchart illustrating a procedure for transmitting broadcast data between a server terminal and a client terminal in the DVB-H service system according to the present invention.

FIG. 2 is a flowchart illustrating a procedure for transmitting broadcast data between the server terminal 200 and the client terminal 300 in the DVB-H service system according to the present invention. The server terminal 200 acquires ESG or Electric Program Guide (EPG) information in step 202. When ESG information is provided from the DVB-H service provider 100, the server terminal 200 receives the ESG information. In contrast, when ESG information is not provided, the server terminal 200 receives PSI, and can acquire EPG information by using an SDT table and ETI.

After acquiring ESG or EPG information, the server terminal 200 creates a DVB-H Service Information web page by using the ESG information or PSI information in step 204. The DVB-H Service Information web page may be created based on the Hypertext Transfer Protocol (HTTP).

FIG. 3 is a diagram illustrating a screen of a DVB-H Service Information web page according to the present invention. The screen of a DVB-H Service Information web page may include various information, such as RF frequencies for service provision, channels according to each frequency, service names, service types, and statuses. The service name information represents each broadcast program name, and service type information represents whether each service refers to a TV service, or a radio service, or a data service.

The server terminal 200 creates the DVB-H Service Information web page as described above, and determines whether or not the client terminal 300 accesses the DVB-H Service Information web page. The client terminal 300 may access the DVB-H Service Information web page according to a user's request, as shown in step 206. The client terminal 300 can access the server terminal 200 through an existing IP network by using port 80 which is an HTTP web server port.

When the client terminal 300 has accessed the DVB-H Service Information web page, the server terminal 200 transmits the data of the DVB-H Service Information web page to the client terminal 300 in step 208.

The client terminal 300 receives the DVB-H Service Information web page, and displays the DVB-H Service Information web page in step 210. Accordingly, the user can recognize DVB-H service information through the DVB-H Service Information web page, so that the user can view a specific broadcast service by selecting the specific broadcast service from the DVB-H service information. It is possible to provide detailed information about a specific broadcast service when the specific broadcast service is selected by the user, and then to provide the specific broadcast service when the specific broadcast service is selected once more.

In the case of showing detailed information about a selected specific broadcast service, when the user selects a specific broadcast service from among the DVB-H service information, the client terminal 300 requests the server terminal 200 to transmit detailed information about the selected specific broadcast service. The server terminal 200 provides the detailed information about the selected specific broadcast service to the client terminal 300 so that the detailed information can be displayed through the client terminal 300.

FIG. 4 is a diagram illustrating a screen of detailed information about a specific broadcast service according to the present invention. When a TV broadcast service is selected, detailed information about the TV broadcast service is displayed. In this case, the detailed information about the TV broadcast service may include TV broadcast service names, TV broadcast service time periods, TV broadcast program contents, etc. If the specific broadcast program among TV broadcast programs is selected as shown in FIG. 4, the detailed information about the selected TV broadcast service may is displayed as shown in FIG. 5. FIG. 5 is a detailed screen showing information about a selected specific broadcast service according to one embodiment of the present invention.

When the specific broadcast service is selected once more by the user while the detailed information about the specific broadcast service is being displayed, the client terminal 300 requests the specific broadcast service selected by the user to the server terminal 200 in step 212.

Then, server terminal 200 receives broadcast data corresponding to the broadcast service requested by the client terminal 300 from the DVB-H service provider 100 in step 214. In this case, the server terminal 200 shifts a reception channel (i.e., RF frequency) for DVB-H service to a specific channel corresponding the broadcast service requested by the client terminal 300, activates the specific channel, receives corresponding broadcast data through the activated channel, and stores the received broadcast data in a memory. The memory may include a flash ROM, a DRAM, etc.

The server terminal 200 removes a header corresponding to a specific protocol, such as an RTP, used for A/V data synchronization from the received broadcast data, changes A/V data, for example, to be adapted to an MPEG4 file system, and again stores the A/V data (i.e., broadcast data) in a file type in step 216.

The server terminal 200 transmits the stored file type broadcast data to the client terminal 300 in a streaming scheme in step 218. The client terminal 300 outputs the broadcast data transmitted from the server terminal 200 in step 220.

When the user requests a broadcast channel change while the broadcast data are being output, the client terminal 300 may request the broadcast channel change to the server terminal 200. When the client terminal 300 requests a broadcast channel change, the server terminal 200 changes the current reception RF frequency to a new reception RF frequency requested by the client terminal 300, and receives and provides a broadcast service corresponding to the requested channel to the client terminal 300. When the number of channel change requests from the client terminals 300 exceeds the number of simultaneously available PIDs in a DVB-H baseband chip, the server terminal 200 transmits a service unavailability message to a client terminal 300 which has transmitted a corresponding request As described above, according to the present invention, the user can view DVB-H broadcasts through an existing terminal, even without buying a terminal having the ability to receive a DVB-H transport stream. Also, according the present invention, it is possible to transmit broadcast data to an existing cellular phone, PC, notebook computer, PDA, digital TV, etc., which provides convenience to the user. In addition, when the apparatus according to the present invention cooperates with a next-generation home system, the user can view a broadcast through various client terminals using one server terminal within home.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. An apparatus for transmitting broadcast data in a digital broadcasting service system, the apparatus comprising:

a server terminal for creating a digital broadcast service information web page by receiving digital broadcast information about a digital broadcast service, the digital broadcast information being provided from a digital broadcast service provider, providing the digital broadcast service information web page, receiving a digital broadcast transport stream from the digital broadcast service provider, removing a header used for the digital broadcast reception from the received broadcast stream, and transmitting a stream of broadcast data, from which the header has been removed; and at least one client terminal for accessing the server terminal through an Internet Protocol (IP) network, requesting and receiving the digital broadcast service information web page, requesting a digital broadcast that is selected by the user from the digital broadcast service information web page, and receiving and outputting the stream of broadcast data, from which the header has been removed, corresponding to the digital broadcast selected by the user, wherein the server terminal is a mobile terminal, wherein the at least one client terminal requests a broadcast channel change from the server terminal, when a user requests the broadcast channel change while the broadcast data is being output, wherein when a channel change by the server terminal is possible, the server terminal changes the current reception RF frequency to a new reception RF frequency requested by the at least one client terminal, when the at least one client terminal requests the broadcast channel change, receives a new broadcast stream corresponding to the requested channel, removes a header used for the digital broadcast reception from the new broadcast stream, and provides the new broadcast stream to the at least one client terminal, and the at least one client terminal receives the new broadcast stream from the server terminal and outputs the new broadcast stream, and wherein when the channel change by the server terminal is not possible, the server terminal sends a service unavailability message to the client terminal, and the at least one client terminal receives and outputs the service unavailability message.

2. The apparatus as claimed in claim 1, wherein the digital broadcast service information web page comprises a channel name, running status, channel time, and broadcast program information about the digital broadcast service.

3. The apparatus as claimed in claim 1, wherein the client terminal receives and outputs the digital broadcast service information web page data, and the client terminal receives specific digital broadcast data from the server terminal and outputs the specific digital broadcast data when a service for the specific digital broadcast is selected by the user.

4. The apparatus as claimed in claim 1, wherein, when a number of channel change requests received from said at least one client terminal is greater than or equal to a threshold, the server terminal transmits a service unavailability message to a client terminal which has transmitted a corresponding request.

5. The apparatus as claimed in claim 1, wherein the header used for digital broadcast reception includes a Real-time Transport Protocol (RTP) used for audio and video data synchronization.

6. The apparatus as claimed in claim 1, wherein the server terminal stores the broadcast data, from which the header has been removed, in a file type, and transmits a stream of the stored file type broadcast data.

7. The apparatus as claimed in claim 6, wherein the file type includes an MPEG4 file type.

8. A method for transmitting broadcast data in a digital broadcasting service system, the method comprising the steps of:

creating, by a server terminal, a digital broadcast service information web page by receiving digital broadcast information about a digital broadcast service, the digital broadcast information being provided from a digital broadcast service provider;

providing, by the server terminal, the digital broadcast service information web page to at least one client terminal, when the client terminal requests the digital broadcast service information web page;

receiving, by the server terminal, a digital broadcast transport stream from the digital broadcast service provider corresponding to a request from the client terminal from the digital broadcast service information web page;

removing, by the server terminal, a header used for the digital broadcast reception from the received broadcast stream; and transmitting, by the server terminal, a stream of broadcast data, from which the header has been removed, to at least one client terminal, wherein the server terminal is a mobile terminal, wherein the at least one client terminal requests a broadcast channel change from the server terminal, when a user requests the broadcast channel change while the broadcast data is being output, wherein when a channel change by the server terminal is possible, the server terminal changes the current reception RF frequency to a new reception RF frequency requested by the at least one client terminal, when the at least one client terminal requests the broadcast channel change, receives a new broadcast stream corresponding to the requested channel, removes a header used for the digital broadcast reception from the new broadcast stream, and provides the new broadcast stream to the at least one client terminal, and the at least one client terminal receives the new broadcast stream from the server terminal and outputs the new broadcast stream, and wherein when the channel change by the server terminal is not possible, the server terminal sends a service unavailability message to the client terminal, and the at least one client terminal receives and outputs the service unavailability message.

9. The method as claimed in claim 8, further comprising:
accessing, by said at least one client terminal, the server terminal through an Internet Protocol (IP) network; and
receiving and outputting the stream of broadcast data from which the header has been removed.

10. The method as claimed in claim 8, wherein the digital broadcast service information web page comprises a channel name, running status, channel time, and broadcast program information about the digital broadcast service.

11. The method as claimed in claim 8, further comprising:
receiving a digital broadcast service change request from said at least one client terminal;
changing each digital broadcast reception frequency to a digital broadcast service reception frequency corresponding to the request in response to the digital broadcast service change request;
receiving a digital broadcast stream corresponding to the changed digital broadcast service reception frequency, and removing a header used for the digital broadcast reception from the received broadcast stream; and
transmitting a stream of broadcast data, from which the header has been removed, to said at least one client terminal which has requested the digital broadcast service change.

12. The method as claimed in claim 11, further comprising transmitting a service unavailability message to a client terminal which has transmitted a corresponding request, when the number of channel change requests received from said at least one client terminal is greater than or equal to a threshold.

13. The method as claimed in claim 8, wherein the header used for digital broadcast reception includes a Real-time Transport Protocol (RTP) used for audio and video data synchronization.

14. The method as claimed in claim 8, wherein the step of transmitting the broadcast data from which the header has been removed comprises:
storing the broadcast data, from which the header has been removed, in a file type; and
transmitting a stream of the stored file type broadcast data.

15. The method as claimed in claim 14, wherein the file type includes an MPEG4 file type.

* * * * *